United States Patent

[11] 3,625,503

| [72] | Inventor | Emery L. Hall<br>Hinsdale, Ill. |
|---|---|---|
| [21] | Appl. No. | 859,015 |
| [22] | Filed | Sept. 18, 1969 |
| [45] | Patented | Dec. 7, 1971 |
| [73] | Assignee | Ram Tool Corporation<br>Chicago, Ill. |

[54] WORKPIECE HOLDER
5 Claims, 5 Drawing Figs.

| [52] | U.S. Cl. | 269/234 |
|---|---|---|
| [51] | Int. Cl. | B25b 1/08 |
| [50] | Field of Search | 269/217, 224, 234, 287; 81/57.2 |

[56] References Cited
UNITED STATES PATENTS

| 486,124 | 11/1892 | Rager | 269/217 |
|---|---|---|---|
| 747,833 | 12/1903 | Alger | 269/234 X |
| 1,554,937 | 9/1925 | Wohlgemuth | 269/234 X |
| 2,754,528 | 7/1956 | Pinkerton | 269/217 X |
| 2,788,686 | 4/1957 | Holt | 269/224 X |

FOREIGN PATENTS

| 18,076 | 0/1892 | Great Britain | 269/217 |
|---|---|---|---|

*Primary Examiner*—Gil Weidenfeld
*Attorney*—Hill, Sherman, Meroni, Gross & Simpson ABSTRACT: A workpiece holder or vise having opposed movable workpiece-grabbing jaws, the upper jaw consisting of two members pivotably connected by a common linkage. Each member has jaw teeth movable towards and away from the teeth of the other member whereby when the upper jaw is forced against the workpiece, the teeth exert independent pressure against the workpiece and attempted rotation of the workpiece in the jaw causes the jaw teeth to squeeze together against the workpiece.

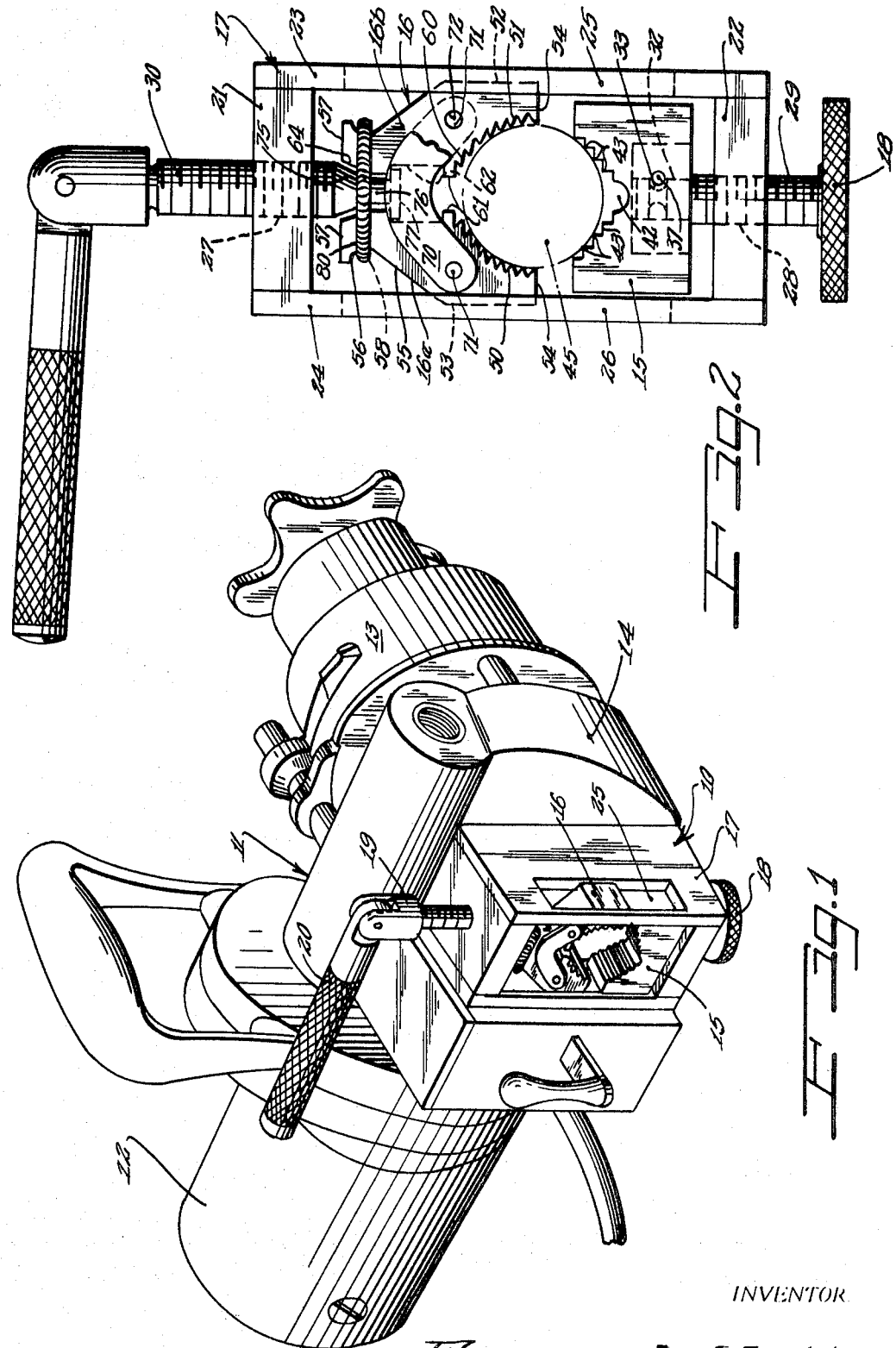

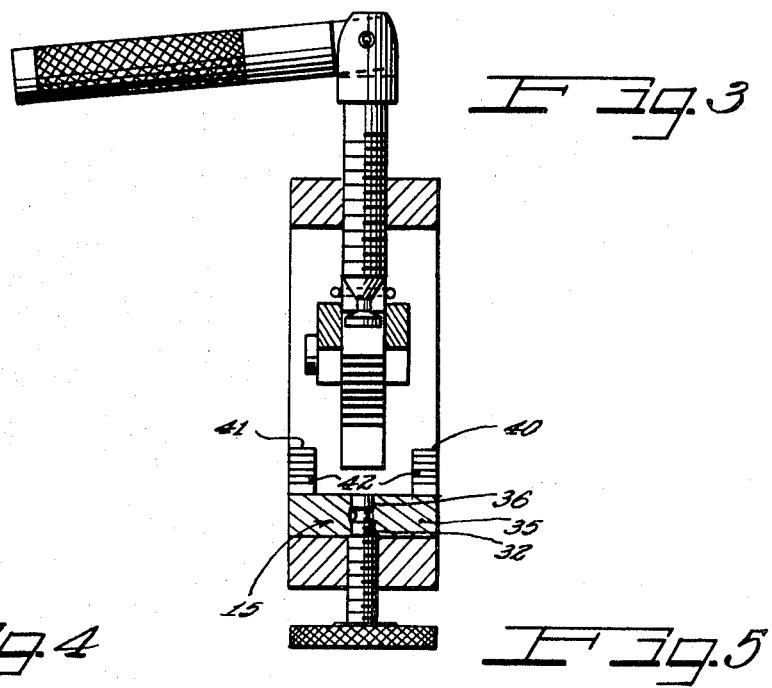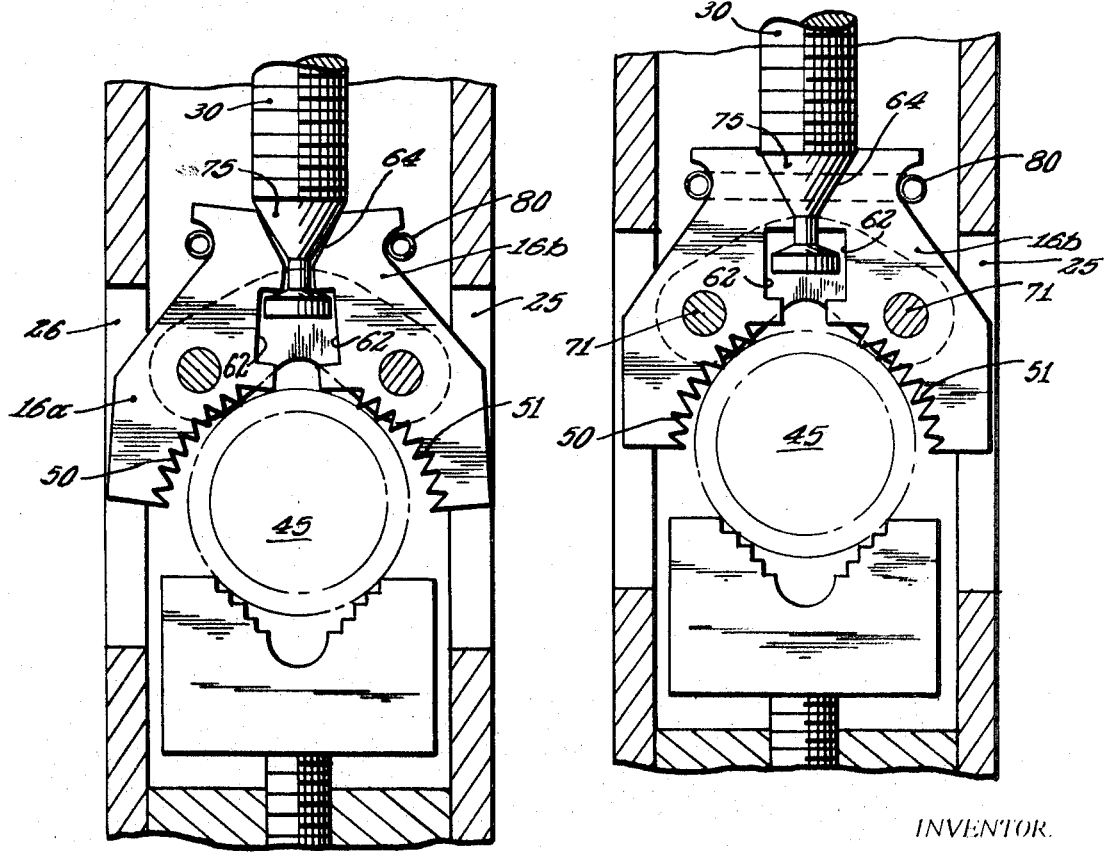

WORKPIECE HOLDER

BACKGROUND OF THE INVENTION

1. Field of the Invention

This invention relates to tools and more particularly to a vise for holding a workpiece.

2. Prior Art

Vises for holding metal workpieces such as pipes or the like consist generally of two opposed members, one of which is capable of movement towards the other to clamp the article therebetween. The members, commonly called jaws, are generally toothed to retard slippage with the teeth stepped towards a central depression whereby the jaw is capable of gripping the circumference of a cylindrical object at a plurality of points.

Such jaws, although capable of gripping a cylindrical object at a plurality of points, due to their central depression, generally in the shape of a "V," apply all of the force in the direction of movement of the movable jaw. Thus, although the workpiece may be retained in the jaws with considerable pressure, slippage can still occur in a rotating direction when a large torque force is exerted against the cylindrical workpiece.

SUMMARY OF THE INVENTION

This invention provides a novel vise which has two opposed jaw members. In the preferred embodiment, each of the jaw members is movable towards and away from the other, and one of the jaw members consists of a set of pivotably connected opposed tooth members, commonly acted upon by a thrust member. The thrust member has a conical portion acting on inclined surfaces of the tooth members above the pivot point to spread the said members apart in response to thrust pressure from the thrust member and resistance to movement towards the other jaw. Spreading the two teeth-carrying members apart above the pivot point causes them to be forced together below the pivot point where they will encompass a workpiece entrapping it therebetween. In this manner, the workpiece is not only clamped between the upper and lower opposed jaw members but also between the individual tooth-carrying members of one of the jaw members. Therefore, the workpiece is gripped more effectively and slippage of the workpiece in a torque direction will increase the pressure with which one of the pivotably connected tooth members grips the workpiece.

A spring connects the two tooth members above the pivot point to draw them back together again in the absence of a counter pressure from the thrust member.

It is therefore an object of this invention to provide an improved vise for gripping workpieces.

It is a further object of this invention to provide a vise for gripping workpieces having upper and lower gripping jaws, the upper jaw movable towards and away from the lower jaw and having two pivotably mounted opposed tooth-carrying surfaces.

It is a further and more specific object of this invention to provide a vise for gripping cylindrical workpieces which has a movable jaw having two pivotably connected tooth-carrying members which are acted upon by a thrust member to bias the tooth-carrying members downwardly and inwardly.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a perspective view of a portable pipe threader equipped with the workpiece holder of this invention.

FIG. 2 is a front plan view of a workpiece holder according to this invention.

FIG. 3 is a side plan view partially in section of the workpiece holder of FIG. 2.

FIG. 4 is a fragmentary partially sectional view of the workpiece holder of FIG. 2 illustrated in its initial workpiece contacting position.

FIG. 5 is a view similar to FIG. 4 illustrating the holder in workpiece clamping condition.

DESCRIPTION OF THE PREFERRED EMBODIMENT

Although my invention may be practiced in a variety of forms and may be used in a vise having only one movable jaw, FIG. 1 illustrates the vise 10 used in connection with a portable power-driven pipe threader 11. The pipe threader 11 has a motor 12 which rotatably drives a cutting die carrying carriage 13 through a gear chain and ring gear 14. Because the die cutter 13 is fixably positioned with a given central opening, the vise 10 has movable lower 15 and upper 16 jaws. Movement of the lower jaw 15 allows a pipe or other workpiece entrapped between the jaws to have its center point positioned coaxially with the center point of the tooth cutting die.

The vise 10 consists of a housing 17, the lower and upper jaw assemblies 15 and 16, a screw-threaded adjusting knob 18 for the lower jaw and a screw thread adjusting control 19 for the upper jaw having a pivoted lever arm 20.

As best illustrated in FIG. 2, the housing 17 consists of top and bottom walls 21 and 22 interconnected by sidewall members 23 and 24. The sidewall members have longitudinal slots 25 and 26 therein and the top and bottom walls 21 and 22 have internally threaded bores 27 and 28 therethrough.

The internally threaded bores 27 and 28 receive externally threaded rods 29 and 30. The externally threaded rod 29 has a control knob on one end thereof and is threaded through the lower bore 28. The threaded rod 29 terminates in a reduced-diameter cylindrical portion 32 having a cylindrical groove 33 therearound. The lower jaw 15, as best illustrated in FIG. 3, consists of a horizontal portion 35 having a central bore 36 therein. The bore 36 has a diameter substantially equal to the reduced-diameter cylindrical portion 32 of the threaded rod 29 (FIG. 2). The horizontal member 35 has a height approximately equal to the cylindrical portion 32 of the threaded rod 29 and the portion 32 projects into the bore 36. A transverse bore 37 (FIG. 2) extends through the horizontal portion 35 and is chordal to the bore 36 in the area of the groove 33. A retaining pin press-fitted through the transverse bore 37 will interfit with the groove 33 to retain the lower jaw member 15 in position on the threaded rod 29. Thereafter adjustment of the knob 18 will raise or lower the lower jaw member 15 in the housing 17.

Vertical tooth members 40 and 41 are integral with the horizontal member 35 at either end thereof providing a substantially U-shaped cross section appearance to the lower jaw member 15. The vertically extending tooth members 40 and 41 have stepped V-shaped grooves 42 therein which are aligned with one another. The stepped V-shaped grooves 42 provide a series of downwardly converging teeth 43 (FIG. 2) for gripping a workpiece 45.

The upper jaw assembly 16 consists of two teeth-carrying members 16a and 16b. The members 16a and 16b are substantially identical and have their tooth-carrying surfaces 50 and 51 opposed to each other in a plane normal to the axis of the workpiece 45. The members are substantially as thick as the guide slots 25 and 26 and side marginal portions 52 and 53 ride in the slots. The side portions 52 and 53 extend from a bottom portion 54 to a slanted midportion 55 at the upper end of the side portion which converges to an out-thrust lip 56 which in turn terminates at the top 57 of the member. A shoulder 58 is created at the junction of the slanted portion 55 and the out-thrust lip 56. The inside surface 60 of the members 16a and 16b consists of a curved tooth-carrying surface 50 or 51 extending from the bottom 54 upwardly and inwardly approximately half the height of the member. The tooth-carrying surfaces terminate in a sidewall 61 parallel to the sides 52 and 53. The sidewalls 61 have opposed grooves 62 therein which face one another. Above the grooves 62 the sidewalls 61 continue for a short distance and terminate in outwardly slanted wall portions 64.

The members 16a and 16b are interconnected by two widespread U-shaped links 70 connected on the front and back of the members by means of rivets 71 or the like which pass through openings 72 in the members 16a and 16b. The links are connected to the members with the bight portion of the wide-spread U-shape extending upwardly away from the tooth areas 50 so as to not interfere with a workpiece enclamped between the members. The rivets 71 are free to rotate within the bores 72 so that the members 16a and 16b may move independently relative to one another within the linkage connection. Thus the linkage connection provides a moving pivot point for the individual members at the rivets 71. In this manner when the tops 57 of the members 16a and 16b are moved away from one another then the tooth areas 50 and 51 will be brought closer together.

The threaded rod 30 terminates in a diameter-reducing frustoconical portion 75 which in turn terminates in a reduced-diameter portion 76 having an increased diameter head 77 at the bottom thereof. The head 77 fits within the grooves 62 and the reduced-diameter portion 76 has an axial length slightly greater than the portion of the inner wall 61 between the groove 62 and the angled portion 64. Thus the members 16a and 16b, as linked together, can be suspended on the head 77 of the thrust member 19 (FIG. 1) with the top of the head contacting the upper shoulder created at the intersection of the groove 62 and the sidewall 61. The taper of the frustoconical portion 75 and the angle of the portion 64 are complementary such that the surface of the frustoconical portion may mate with the angled portion 64 as a mating incline plane wedge surface.

In this manner when the thrust member 19 is moved downwardly as by threading the threaded rod 30 into the bore 27, the upper jaw assembly 16 will be moved downwardly onto a workpiece 45 resting on the lower jaw assembly. In order to retain the members 16a and 16b in position on the head 77 and to keep the tooth surfaces 50 and 51 from moving towards one another, the members are biased towards one another at the top as by means of a coil spring 80 encircling the members and the end of the threaded rod 30. The coil spring 80 is received in the shoulder 58. The coil spring 80 will draw the upper portion of the members 16a and 16b towards one another until the sloping faces 64 contact the threaded rod 30. Because of the pivotal linkage attachment of the members 16a and 16b the tooth-carrying surfaces 50 and 51 will be spread apart. Thus the upper jaw assembly may be moved downwardly onto the workpiece 45 until the workpiece is received between the tooth-carrying surfaces and these surfaces have contacted the surface of the workpiece along their upper portions. This position is illustrated in FIG. 4.

Further downward movement of the threaded rod 30 will allow the head 77 to project downwardly into the groove 62. Thereafter the slanted faces 64 will be engaged in mating sliding relation with the frustoconical portion 75. Continued downward movement of the rod 30 will force the frustoconical portion against these surfaces resulting in a downward and outward force being applied against the surfaces. This will cause the individual members 16a and 16b to be thrust both downwardly and outwardly at the top. This will be converted by the linkage connection into a downwardly and inwardly thrust at the tooth surfaces 50 and 51. Thus the members will rock about the rivet connections 71 which provide pivot points causing the tooth surfaces 50 and 51 to grip the workpiece both with a downward and with an inward force. This position is illustrated in FIG. 5 where it can be seen that a greater number of teeth on the surfaces 50 and 51 are contacting the workpiece 45 than was the case in FIG. 4 before the upper portions of the members 16a and 16b were forced apart by contact with the frustoconical portion 75. It can therefore be seen that my invention provides a two-jaw assembly vise which grips a workpiece with a pressure force operating both downwardly and inwardly from the movable jaw teeth.

A further advantage in this invention arises from the fact that when a large torque force is applied to the workpiece, as by the cutting die in the pipe threader illustrated in FIG. 1, a tendency on the part of the workpiece to rotate in the vise will be translated by the linkage attachment of the members 16a and 16b in a manner which will cause the members to grip the workpiece harder. Thus this vise is better able to restrain a workpiece against torque rotation.

As illustrated in FIG. 3 the members 16a and 16b (FIG. 2) of the upper jaw assembly are dimensioned to fit between the tooth-carrying members 40 and 41 of the lower jaw assembly 15. This allows the vise to accommodate workpieces of a wide variety of sizes. When a workpiece having relative size as illustrated in FIGS. 4 and 5 is enclamped by the jaws, the upper jaw assembly will not reach the lower jaw assembly. However when the workpiece of a smaller diameter is encountered, the upper jaw assembly may be lowered to a point where the members 16a and 16b will have their bottom surfaces below the top surfaces of the members 40 and 41 of the lower jaw assembly.

Another feature of this invention is the provision of the guide slots 25 and 26 (FIG. 2) which receive the marginal edge portions 52 and 53 of the members 16a and 16b. The guide slots allow the upper jaw assembly to be movable towards and away from the lower jaw assembly while preventing rotation of the members 16a and 16b. It is to be understood of course that the slots are merely to prevent rotation and to guide the movement of the upper jaw assembly and that they could be replaced by other means functioning the same or differently which will serve the same purpose such as by grooves in an otherwise solid frame wall. Likewise the coil spring 80 can be replaced with a different type of spring member or device which will cause the upper portions of the members 16a and 16b to be drawn together in the absence of a counterthrust. This will keep the tooth-bearing surfaces 50 and 51 drawn apart from one another so that a workpiece may be received therebetween.

It can therefore be seen from the above that my invention provides for an improved workpiece-holding device which has relatively movable workpiece-gripping jaws, one of which is a multipiece jaw capable of asserting force against a workpiece both in a direction towards the other jaw and in an opposed inwardly directed direction upon the workpiece itself to more efficiently enclamp the workpiece.

Although minor modifications might be suggested by those versed in the art, it should be understood that we wish to embody within the scope of the patent warranted hereon all such modifications as reasonably and properly come within the scope of our contribution to the art.

I claim:

1. A vise for retaining a cylindrical workpiece against rotation which comprises a normally stationary member having spaced-apart workpiece-gripping toothed surfaces, a movable assembly movable towards and away from normally stationary member, said movable assembly having two workpiece-gripping members, the member having toothed surfaces spaced from and opposing one another, the members pivotably connected to a common linkage, the pivotable connections spaced intermediate the top and bottom of said members whereby the tops of said members may be moved towards and away from one another to effectuate movement of the toothed surfaces towards and away from one another, toothed surfaces being disposed towards the bottoms of the members and being movable towards one another in dependent response to the movement of the tops of said members away from one another, the toothed surfaces being movable in a plane normal to the axis of a workpiece received by the normally stationary member, and means for moving the movable assembly towards the normally stationary member and means for forcing the tops of the pivotably connected members away from one another in dependent response to resistance to further movement of the movable member towards the stationary member and to continued movement of the means for moving towards the normally stationary member, said resistance caused by contact between the toothed surfaces and the workpiece.

2. A vise for enclamping a cylindrical workpiece comprising upper and lower jaw assemblies, said lower jaw assembly having spaced-apart workpiece-gripping members, said members having serrated grooves therein for receiving a portion of the circumference of the workpiece, said upper jaw assembly movable towards and away from a said lower jaw assembly, said upper jaw assembly having two separate workpiece-gripping members separated from one another in a plane normal to the axis of a workpiece received by the lower jaw assembly, each of said workpiece-gripping members having an upper portion and a lower portion, said lower portions having serrated edges facing one another, said serrated edges dimensioned to receive the said workpiece therebetween when the upper jaw assembly is moved towards the lower jaw assembly, the said gripping members pivotably connected to a common linkage, the said pivotable connections of said members spaced from the ends thereof whereby movement of the upper portions away from one another will cause the serrated edges to move towards one another, means normally biasing said upper portions towards one another, first means for moving the upper jaw assembly towards and away from the lower jaw assembly and second means for moving the upper portions of the gripping members away from one another, said second means including a tapered surface forceable between opposed surfaces of the upper portions to wedge said opposed surfaces apart.

3. The vise of claim 2 wherein the said upper and lower jaw assemblies are received in a housing spaced-apart portions stationarily disposed with respect to one another, the said means for moving the said upper jaw assembly toward the lower jaw assembly comprising an externally threaded rod journaled into an internally threaded bore in one of said stationary portions, the upper jaw assembly being operatively attached to the said threaded rod between the portions and the lower jaw assembly being operatively attached to the other of said stationary portions opposite the first-mentioned stationary portion whereby rotation of the threaded rod will move the upper jaw assembly with respect to the lower jaw assembly.

4. The vise of claim 3 wherein the means for moving the upper portions of the gripping members away from one another comprises a frustoconical surface on said threaded rod and inclined surfaces on said upper portions, the said frustoconical surfaces slidable against said inclined surfaces to spread the said inclined surfaces apart.

5. A jaw assembly for a vise which comprises an axially movable threaded member, a frustoconical surface adjacent one end of said member, an increased diameter portion on the said one end spaced from the small diameter end of the said frustoconical portion and integral therewith through a small diameter cylinder portion, two spaced-apart members having opposed faces, said spaced-apart members pivotably connected to a common linkage member, the faces being parallel to the axis of the pivots, said pivotable connections intermediate the ends of said spaced apart members, portions of said opposed faces to one side of said pivotable connections being serrated and diverging from one another, opposed grooves in said faces opening towards one another, said grooves separated from said serrated edges thereof, said opposed faces diverging at a common angle from one another at the ends of said members opposite the serrations, said common angle complementary to said frustoconical portion, spring means biasing the common angle diverging ends toward one another, said increased diameter end of the thrust rod received between the faces in the said grooves and movable therein whereby the said threaded rod is operatively attached to the said pivotably connected members by contact between the increased diameter end and the groove walls and movable with respect thereto to being the frustoconical portion into sliding contact with the commonly angled diverging surfaces in a wedge action to spread the said surfaces apart whereby the serrated surfaces will be pivotably moved towards one another.

* * * * *